United States Patent [19]

Livingston

[11] Patent Number: 5,232,329
[45] Date of Patent: Aug. 3, 1993

[54] CARGO HANDLING APPARATUS

[76] Inventor: Edwin E. Livingston, 47 Schneider Rd., Cody, Wyo. 82414

[21] Appl. No.: 855,656

[22] Filed: Mar. 23, 1992

[51] Int. Cl.$^5$ ............................................. B60P 1/48
[52] U.S. Cl. .................................. 414/494; 414/462; 414/500; 414/542; 414/546
[58] Field of Search ............... 414/469, 491, 494, 498, 414/500, 462, 540, 546, 555, 542

[56] References Cited

U.S. PATENT DOCUMENTS

| | | | |
|---|---|---|---|
| 2,351,829 | 6/1944 | Milner | 414/494 X |
| 2,354,337 | 7/1944 | Smith | 414/494 |
| 3,086,465 | 4/1963 | De Montfort | 414/469 X |
| 3,276,610 | 10/1966 | Thatcher | 414/546 X |
| 3,709,467 | 1/1973 | Mann | 414/498 X |
| 3,794,192 | 2/1974 | Monson | 414/542 X |
| 3,883,020 | 5/1975 | Dehn | 414/498 |
| 3,927,779 | 12/1975 | Johnson | 414/462 |
| 3,957,166 | 5/1976 | Durham | 414/494 |
| 4,274,788 | 6/1981 | Sutton | 414/462 |
| 4,316,687 | 2/1982 | Lindskog | 414/498 X |
| 4,383,791 | 5/1983 | King | 414/546 X |
| 4,589,671 | 5/1986 | Boughton | 414/546 X |
| 4,930,799 | 6/1990 | Pihlström et al. | 414/494 X |
| 4,975,019 | 12/1990 | Cate et al. | 414/494 X |

FOREIGN PATENT DOCUMENTS

| | | | |
|---|---|---|---|
| 1396453 | 3/1964 | France | 414/500 |
| 2492789 | 4/1982 | France | 414/462 |

Primary Examiner—David A. Bucci
Attorney, Agent, or Firm—Douglas M. Clarkson

[57] ABSTRACT

A cargo handling apparatus is described for lifting, transporting and unloading cargo in connection with a vehicle, such as a pickup truck. The apparatus is fastened to the vehicle and has a separate platform upon which cargo is placed and attached while the platform is on the ground. An end of the platform then is raised by a winch and cable to a height approximately to the bottom of a boom assembly. The boom then is lowered slightly to a slope approximating the slope of the platform and attached cargo. The platform now is movable along the boom by the winch and cable, and finally, the boom is pivotable down onto the vehicle. All operations are controlled from a hand held unit.

25 Claims, 6 Drawing Sheets

CARGO HANDLING APPARATUS

BACKGROUND OF THE INVENTION

1. Field of the Invention

The present invention, in general, relates to an apparatus for handling cargo and, more particularly, to an apparatus to assist in the loading, unloading and transport of cargo in cooperation with a vehicle, such as a pickup truck, and the like.

Utility vehicles, such as pickup trucks and flatbed vehicles, are capable of transporting items which are too heavy for an individual to lift. Consequently, various configurations of load lifting apparatus have been devised to assist in the loading and unloading of heavy cargo items. While such apparatus are useful, usually they are limited to the cargo items they are configured to lift.

A load lifting apparatus that is adapted for use with a motor vehicle should be capable of loading a wide variety of cargo items. For example, the same pickup truck may be called upon to transport snowmobiles in the winter, four-wheel drive recreational-type vehicles in the spring, boats in the summer, and even game animal carcasses, such as deer, in the autumn. Clearly, an apparatus mountable on pickup and flatbed trucks that provides assistance for the loading and transport of a wide variety of cargo items, is a useful and desirable device.

2. Description of Prior Art

Some of these specialized load lifting and transport devices for use with motor vehicles are known. For example, U.S. Pat. No. 3,128,893 to Jones, that issued Apr. 14, 1964, describes a boat handling, loading, and transport assembly for transferring a boat between the ground and the roof of a motor vehicle.

U.S. Pat. No. 3,794,192 to Monson, that issued Feb. 26, 1974, describes a pickup truck hoist consisting of pivotable supports capable of longitudinal mobility within the back of the pickup truck.

U.S. Pat. No. 3,885,689 to Grove et al., that issued May 27, 1975, describes a boat loading and unloading apparatus with a loading line, winch, stand and carrier assembly.

U.S. Pat. No. 3,894,643 to Wilson, that issued Jul. 15, 1975, describes a loading hoist for lifting boats from the ground to the top of a vehicle.

U.S. Pat. No. 3,927,779 to Johnson, that issued Dec. 23, 1975, describes a car top carrier for boats that includes a pair of guide rails mounted on the top of the car.

U.S. Pat. No. 3,972,433 to Reed, that issued Aug. 3, 1976, describes a self loading and carrying apparatus with a load carrying platform that is slidable on supporting members.

U.S. Pat. No. 4,239,440 to James, that issued Dec. 16, 1980, describes an apparatus for transferring a load into and out of the bed of a pickup truck by the use of a horizontally moveable boom structure and winch.

U.S. Pat. No. 4,274,788 to Sutton, that issued Jun. 23, 1981, describes a vehicle mounted carriage and elevating apparatus.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide an apparatus for rendering mechanical assistance in the loading and unloading of a wide variety of cargo items into and out of the bed of a pickup truck.

It is also an object of the invention to provide a load lifting apparatus that is both safe and easy to use.

Another object of the invention is to provide an apparatus useful in the transportation of a variety of cargo items.

Briefly, a cargo handling apparatus that is constructed in accordance with the principles of the present invention has a frame assembly constructed and arranged to conform with a limited space of a vehicle, in the described case, a pickup truck. A boom with a winch is supported pivotably on the frame assembly mounted on a vehicle for raising and lowering the platform assembly with an attached cargo onto the vehicle by, first, raising an end of the platform to the height of the lower end of the boom, lowering the boom part way, pulling the platform onto the boom and lowering the boom on the vehicle.

DETAILED DESCRIPTION OF THE INVENTION

Figure 1:
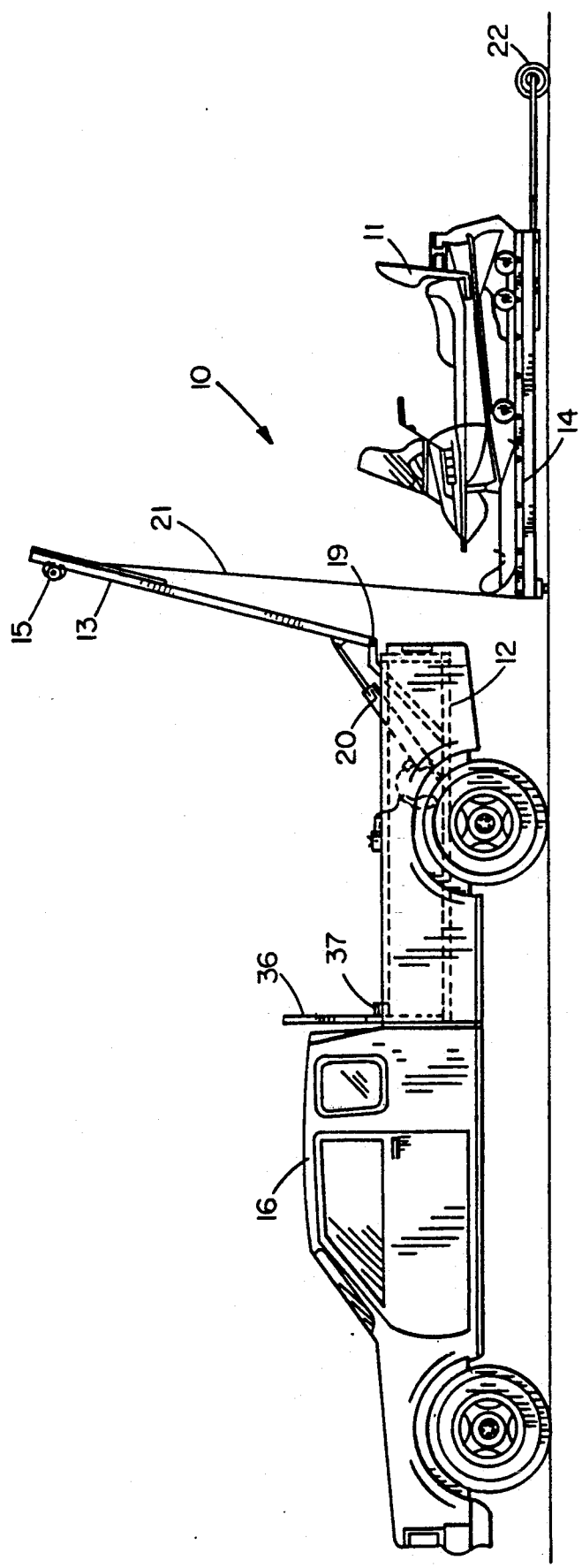
FIG. 1 is a side view of a cargo handling apparatus in accordance with the invention showing the platform in the preferred position for the loading and unloading of cargo.

Referring to FIG. 1, a cargo handling apparatus that is constructed according to the invention, is identified generally by the numeral 10. A snowmobile is shown as one possible cargo and is identified throughout the several figures by the numeral 11. The principal component parts of the cargo handling apparatus 10 are a frame 12, a boom 13, a platform 14 and a winch 15.

The frame 12 is formed of suitable dimensions to fit a vehicle with which the apparatus 10 is to be used; in this instance, it is the back of a pickup truck. Therefore, the frame 12 fits into the truck 16, and the end nearest the cab is anchored, such as by suitably located bolts.

Figure 11:
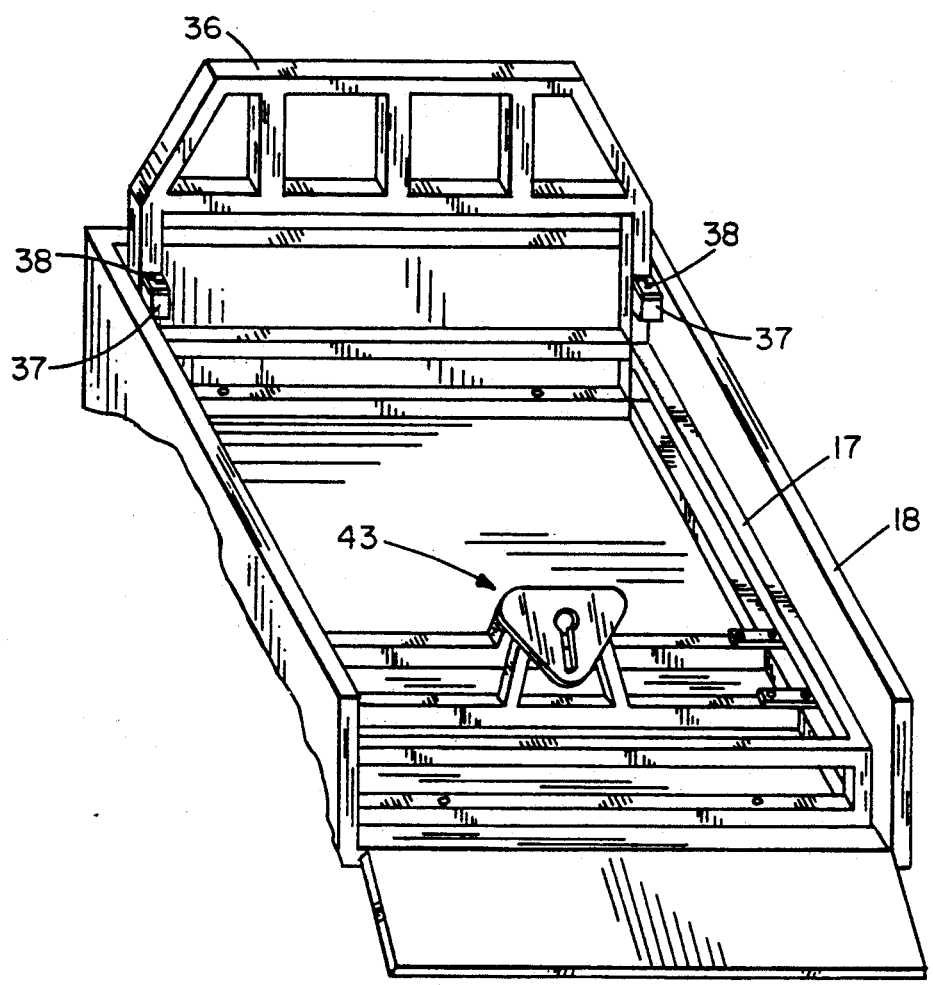
FIG. 11 is a view in perspective of a 5th wheel trailer hitch attached to a modified form of the apparatus of the present invention.

Details of the frame 12 are best seen in FIG. 11 of the drawings, where the height of a top rail 17 is shown recessed down from the side 18 of the truck. However, as seen in FIG. 1, an exact location of the top rail 17 of the frame 12 is not critical to the functioning of the apparatus 10.

The boom 13 pivots at a hinge 19, which is appropriate for support of the boom 13 by the frame 12. The end of the frame 12 with the hinge 19 is reinforced sufficiently for this purpose.

To pivot the boom 13 about the hinge 19, hydraulic cylinders 20 are attached between the frame 12 and the boom 13. Therefore, the boom 13 is raised to a position past the vertical so that a flexible cable 21 will clear the rear of the truck 16, as illustrated in FIG. 1.

Figure 2:
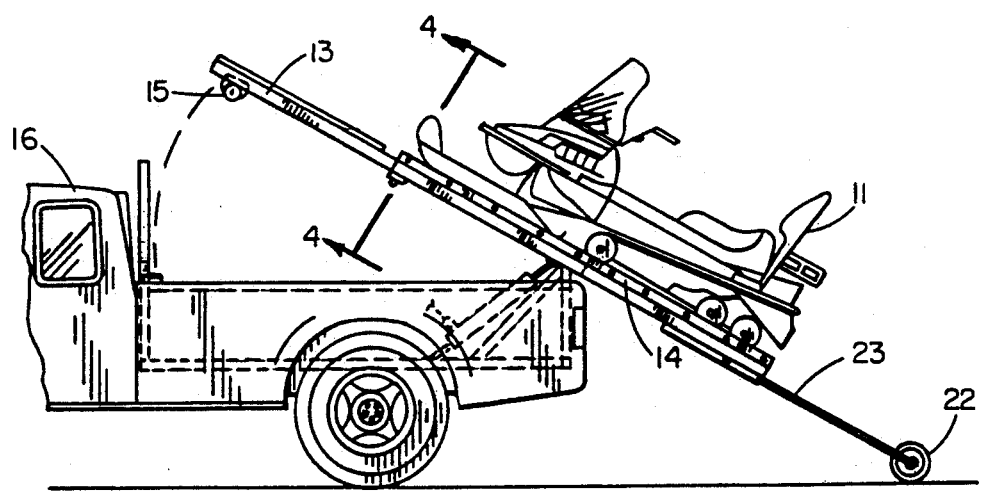
FIG. 2 is a side view of the apparatus of the invention showing the platform with cargo partially up on a partially lowered boom, as an aid in describing the invention.

The cable 21 is attached at one end of the platform 14, the opposite end of the platform having wheels 22. As seen in FIG. 2, the wheels 22 are on bars 23 that are extendable so that, when the end of the platform is raised by the cable 21 to approximately the height of the hinges 19, FIG. 1, and the boom 13 is lowered about half way toward the cab of the truck 16 in a direction away from the platform 14 (to approximately 45 degrees), the platform, with the cargo loaded, is pulled easily onto the boom 13.

Therefore, the longer the bars 23 are extended, the further down the boom can be lowered to match the inclination of the platform, and in such a lower position, less work is required to pull the loaded platform onto the boom. From the position shown, the winch 15 continues to pull on the cable 21 until the loaded platform is in a position shown in FIG. 5, at which point the front end of the platform 14 is about at the top of the boom.

Since the winch 15 is not at or above the upper end of the boom 13, the cable 21 is attached to the platform 14 at a point back from its leading edge. For example, FIG. 3 shows the cable 21 coming down (from the winch), wrapping around and under the front leading edge 24 and attached to a hook 25 which, since the platform 14 is flat on the ground, is accessible readily through a hand opening 26.

The platform 14 is shown on the surface of the ground. The wheels 22 are located on the platform 14 at the end furthermost from the end that is raised by the cable 21 to reduce the resistance that would be encountered otherwise.

Figure 3:
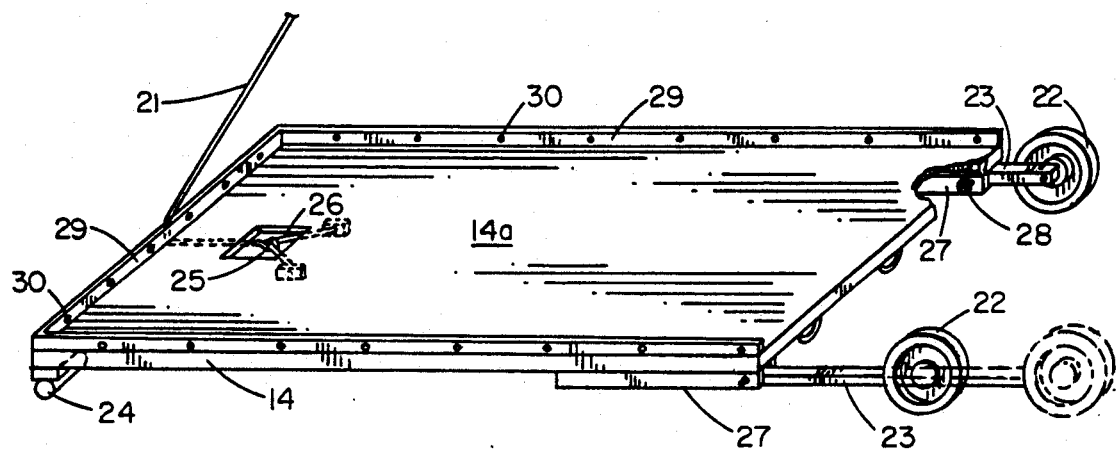
FIG. 3 is a view in perspective of a portion of the platform, without the cargo.

As best seen in FIG. 3, each of the wheels 22 is mounted on a bar 23 that slides in a telescoping manner relative to a hollow tube 27 on the platform 14. A spring loaded pin 28 on the tube 27 secures the telescoping bar 23 in the position it is set. Clearance holes (not visible) are located at intervals along one side of each telescoping bar 23 to receive each pin 28.

Also seen in this view is the substantially flat surface 14a of the platform 14 with raised sides 29 a small distance up from the surface around three sides as an aid when positioning a cargo. With a cargo located on the surface 14a, holes 30 at spaced apart intervals in the three sides 29 provide places for attaching tiedown members to secure a cargo.

Figure 4:
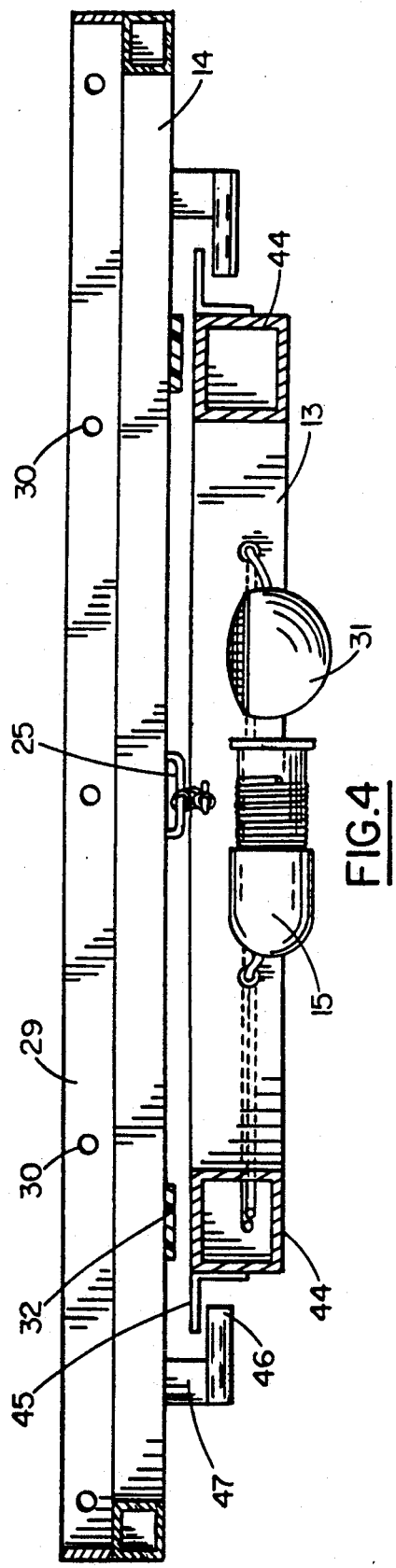
FIG. 4 is a view taken along the line 4—4 in FIG. 2 showing the structure at the upper end of the boom.

FIG. 4 is a view looking toward the end of the boom with the platform partially on the boom, as shown in FIG. 2. In this view, the winch 15 near the top of the boom 13 is seen clearly, as is a light 31 attached to the boom near the winch. The utility light 31 is mounted at the upper end of the boom 13 to provide light for loading and unloading when visibility is difficult.

A Teflon plastic pad 32 is attached underneath the platform 14 to make the platform 14 easily slidable on the boom. It is contemplated that these plastic pads 32 will be replaced on later versions of the apparatus 10 with rollers, because with heavier loads, rollers will make this sliding action somewhat easier.

Figure 5:
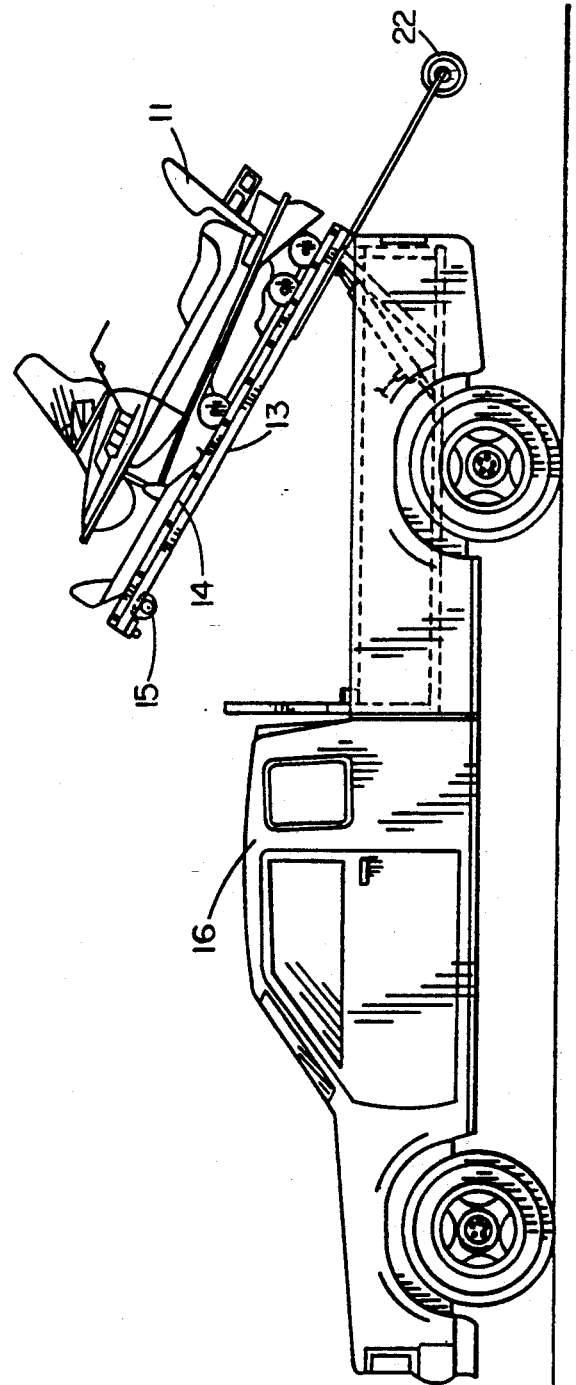
FIG. 5 is a side view of the apparatus of the invention showing the boom in a partially lowered position with the platform and cargo in position for final lowering of the boom.

With the loaded platform 14 fully on the boom 13, as shown in FIG. 5, the wheels 22 will be off the ground, as illustrated. However, the telescoping bars 23 supporting the wheels will still be extended.

Figure 6:
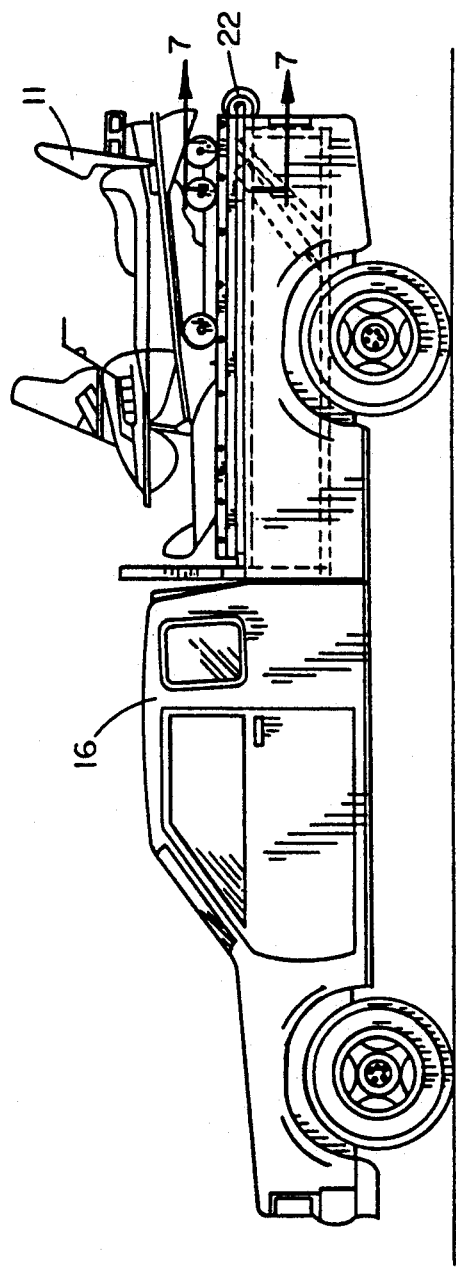
FIG. 6 is a side view of the apparatus and platform in a fully lowered position.
Figure 7:
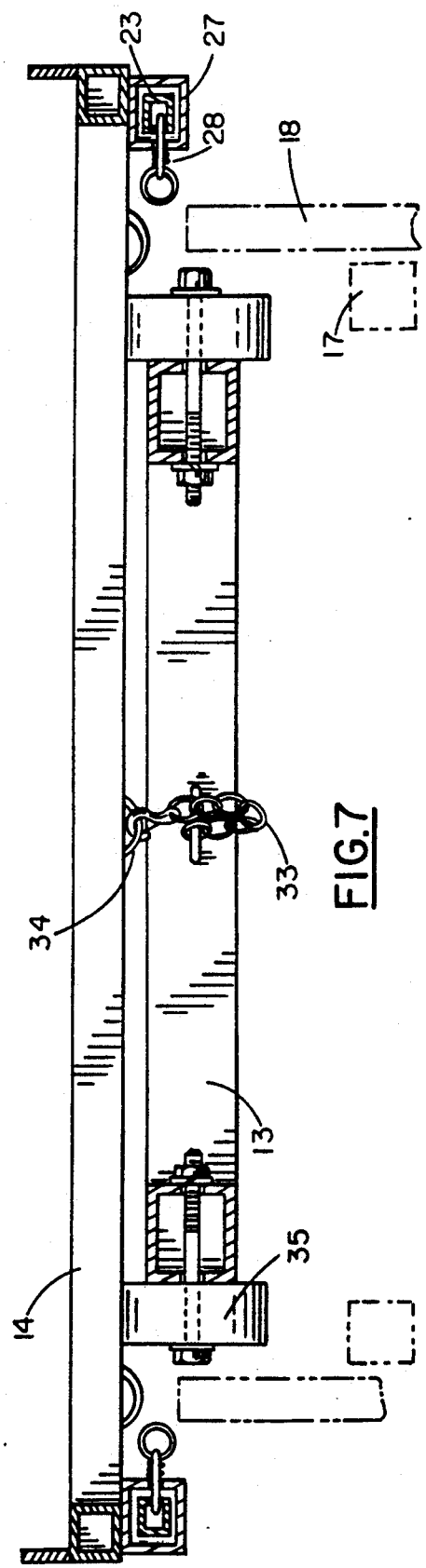
FIG. 7 is a view taken along the line 7—7 in FIG. 6 the showing the relative width of the platform and boom as an aid in describing features of the invention.

FIG. 6 shows the boom in its completely lowered position, and now, the wheels 22 are retracted and secured with the pin 28 on each wheel support bar 23. Looking along the line 7—7, the view of FIG. 7 shows that a chain 33 is attached to a hook 34 at the back end of the platform 14 as a further safety precaution during transit.

Also seen clearly in this view are two rollers 35 on the sides of the boom 13, because it is at this point when the platform first engages the boom during loading that the friction is the greatest. As a practical matter, rollers like the rollers 35 can be located anywhere they are believed to be needed along the boom 13, as mentioned hereinabove.

Also seen clearly here is the relative height that the boom 13 is supported by the frame 12 to clear the sides 18 of the pickup truck. The topmost rail 17 of the frame 12 is the support for the hinges 19 that form the pivot point for the boom.

The cable 21, or other flexible means such as a rope, extends from the winch 15 and is attached to the hook 25 (FIG. 3) on the under side of the platform 14 through the opening 26. The winch 15, preferably, is operated electrically, and its use will be described presently.

The lower end of the boom 13 is supported pivotally on the frame 12 at pivot points, illustrated by the hinges 19, one hinge at each side of the boom. A triangular gusset, not visible, is a presently preferred way to strengthen the frame 12 on each side since all component parts of the cargo handling apparatus 10, including the detachable platform 14, are supported during loading and unloading by the frame 12.

The frame 12 is constructed and arranged to be supported on the bed of a pickup truck 16, primarily, but also, it can be supported as a unit on any four wheeled vehicle and bolted where required through its floor. The detachability of the platform 14 has many benefits, one being that, with the platform 14 detached, the other components are much more easily mounted within the bed of a pickup truck 16 as a unit.

For the preferred embodiment, there are two hydraulic cylinders 20, each mounted to the frame 12 at one end, within the bed of the pickup truck 16, and the remaining end of each cylinder is attached to the boom 13. Two hydraulic cylinder 20 are used to equalize the pushing and pulling forces between the boom 13 and the frame 12.

While the various hoses and other connections usually found with such hydraulic cylinders are well known, a flow control valve, not visible, is one specific hydraulic component of special interest in that it is not usually found on cargo handling apparatus. Such a valve is attached directly to the lower fluid inlet port where hydraulic fluid enters the base of each hydraulic cylinder 20.

The flow control valve is connected so as not to restrict significantly the flow of hydraulic fluid entering the base of each hydraulic cylinder 20. Therefore, the rod of each hydraulic cylinder 20 is able to extend at the maximum rate of flow that the hydraulic fluid is delivered.

Each of the hydraulic cylinders 20 is connected so that both the extension stroke and the retraction stroke of the rods are accomplished by the direct flow of the hydraulic fluid. Such a hydraulic cylinder is identified usually as double acting.

Both of the hydraulic cylinders 20 of the present invention are of the double acting type. This permits an operator to control the position of the boom 13 carefully and with greater precision than would other wise be possible with single acting hydraulic cylinders.

Each flow control valve is adjustable to variably restrict the rate of hydraulic fluid flow. Therefore, each control valve is adjusted to permit an unrestricted flow of hydraulic fluid entering each cylinder 20 while restricting the rate of flow of fluid leaving.

Their are two reasons for limiting the rate of flow of hydraulic fluid leaving each cylinder 20. The first is that the speed of movement of the boom 13 is slowed during the loading cycle and, especially, during that portion of the loading cycle where the boom 13 and platform 14 are being lowered onto the frame 12. Restricting the rate that the hydraulic fluid is permitted to leave each cylinder prevents inexperienced operators from lowering the boom 13 and the platform 14 too abruptly.

The second reason for limiting the rate of hydraulic fluid leaving through the lower port of each hydraulic cylinder 20 is to provide added safety in the event of a loss of fluid pressure. Without a limitation in the rate of flow of hydraulic fluid, a rupture in the hydraulic hose could cause the sudden loss of hydraulic fluid resulting in damaged equipment and/or personal injury.

Figure 8:
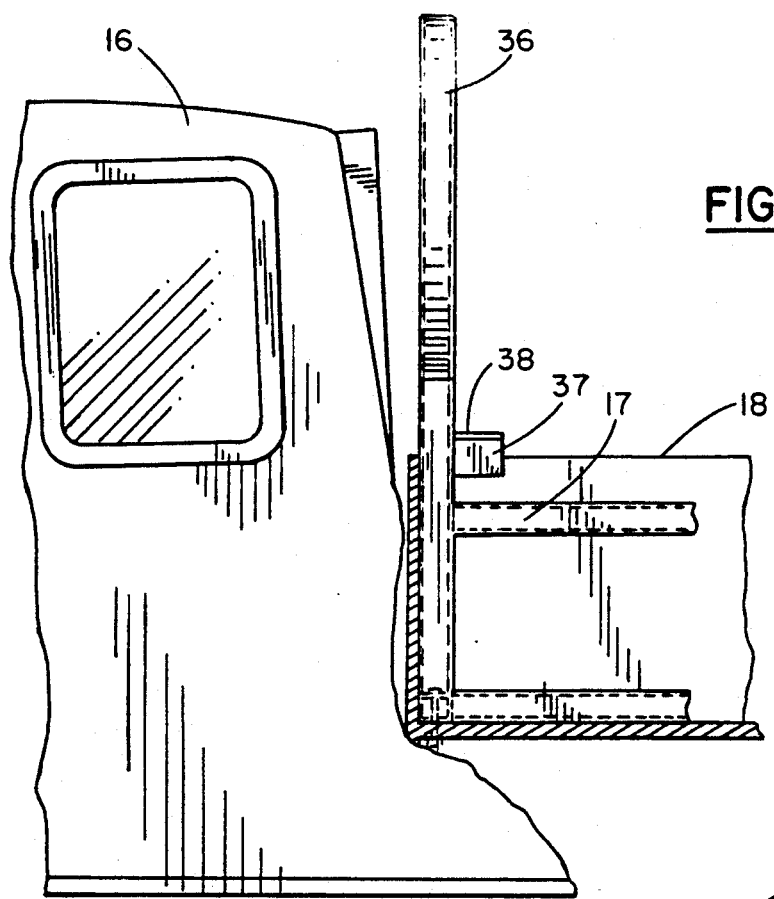
FIG. 8 is a side view of the end of the apparatus of the invention showing the structure to protect a vehicle cab and to support the platform and boom in the cargo transport position.

As seen in FIGS. 1, 8 and 11 a safety guard rack 36 is attached to the end of the frame 12, the end nearest the cab of the pickup truck 16. The guard rack 36 is identified as a "headache" rack. It prevents items of cargo 11 from sliding into the rear of the cab of the pickup truck 16.

Two stop plates 37 are attached to the lower part of the guard rack 36 just above the top rail 17 of the frame 12, one stop plate 37 on the passenger side and another on the driver side. The stop plates 37 limit the downward travel of the boom 13 and the platform 14, thus ensuring these component parts are in a substantially horizontal position, i.e., generally parallel with the ground 15.

Located on the upper surface of each stop plate 37 is a cushion 38 formed of a resilient material and attached to the plate 37 by any suitable means to prevent metal to metal contact with the boom 13. The cushion also prevents noise and wear.

Figure 9:
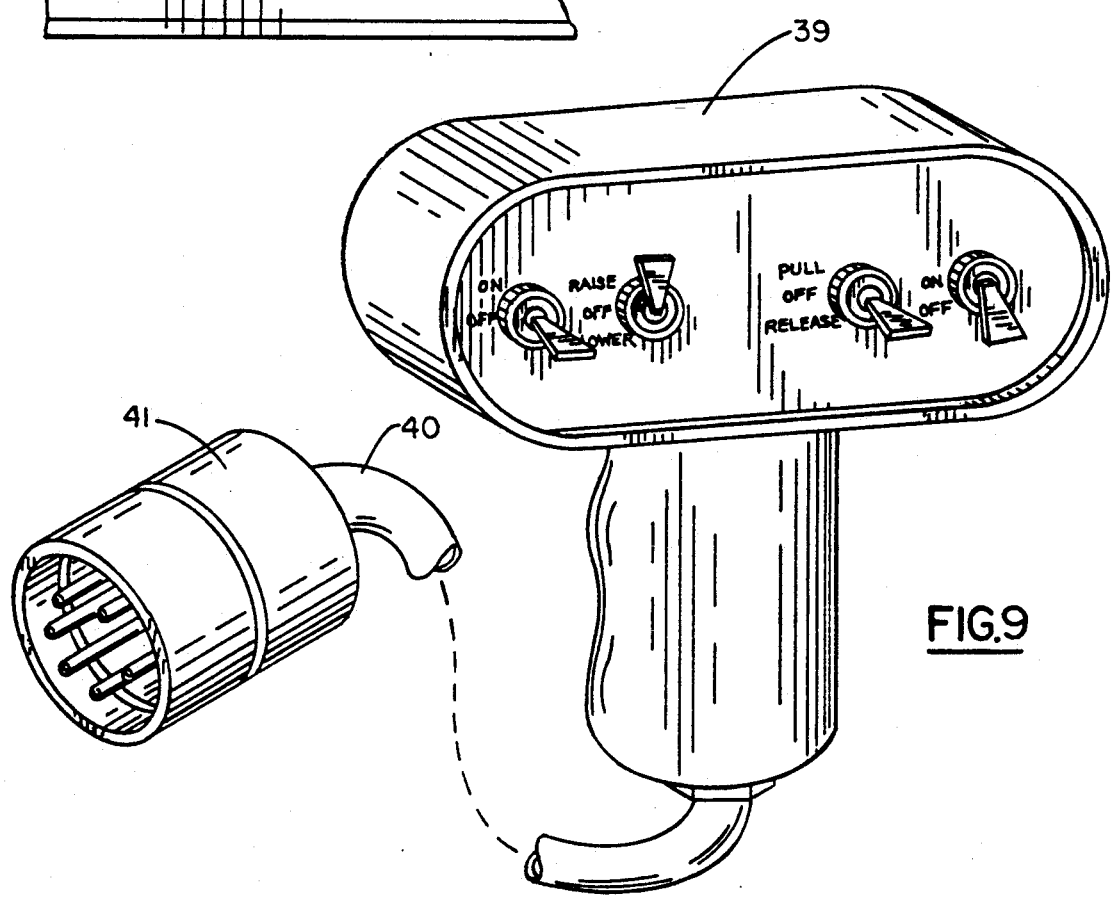
FIG. 9 is a view in perspective showing an arrangement of switches for the hand held unit permitting remote operation of the apparatus of the invention.

In FIG. 9, a hand held control unit 39 is shown for controlling all of the operations for the cargo handling apparatus 10. One of the switches on this unit, according to the invention, is a safety kill switch with an "on" and an "off" position.

When the safety switch is "off", all of the other switches are inoperative. There are various techniques to achieve this condition, and the presently preferred is to connect the power supply (12 volts DC) through the safety switch to all of the other switches.

Another switch on the control unit 39 controls the flow of hydraulic fluid to the hydraulic cylinders 20 to move the boom 13 into its various operating positions. The boom switch, in the presently preferred arrangement, has 3 positions, a center "off" position with "raise" and "lower" positions on opposite sides.

Still another switch on the control unit 39 controls the winch 15 and, also, is a three position switch with a center "off" position and with cable "pull" and cable "release" positions on opposite sides.

A fourth switch on the control unit 39, with "on" and an "off" positions, operates the utility light 31, FIG. 4.

Attached to the control unit 39 is an electrical cable 40 that is a convenient length to permit an operator to stand a substantial distance from the vehicle during the operation of the apparatus 10. A plug 41 on the end of the cable 40 is to connect the control unit 39 with a receptacle on the frame 12.

When the control unit 39 is disconnected from the receptacle, all control functions involving the apparatus 10 are disabled. Therefore, simply unplugging and removing the control unit 39 provides a way to prevent the unathorized use of the apparatus 10.

Figure 10:
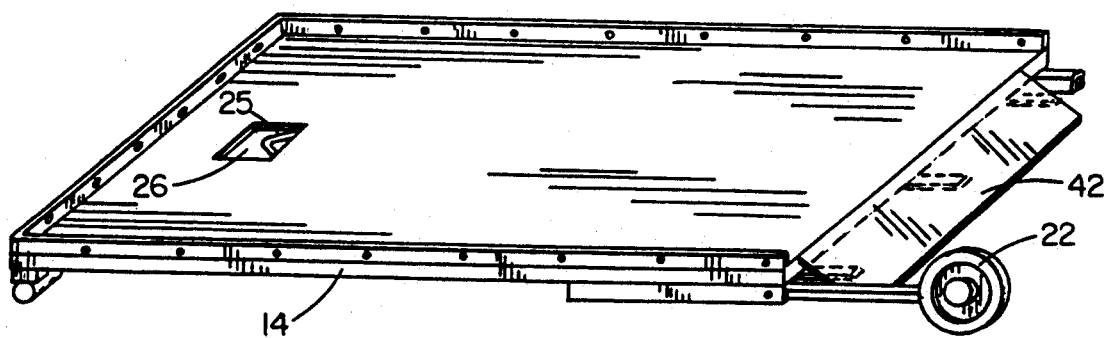
FIG. 10 is a view in perspective of a modification of the platform assembly of the invention.

FIG. 10 shows the platform 14 of the invention in more detail and shows a ramp 42 at the end of the platform 14 between the wheels 22. The ramp 42 is attached to the edge of the platform 14 and slopes downwardly as an aid in loading a cargo on the surface of the platform.

FIG. 11 shows a trailer 5th wheel trailer hitch assembly 43 attached directly to the frame 12. The configuration of the hitch assembly 43 is a modification to which the cargo handling apparatus 10 of the present invention is readily adapted to accommodate.

OPERATION

A cargo handling apparatus 10 constructed and arranged according to the principles of the invention, as described in detail hereinabove has a frame 11 of limited and constrained dimensions to fit a vehicle, such as the back of a pickup truck 16. A boom 13 is formed of spaced apart members 44 that extend substantially its length so that a separate platform 14 is guided along their length, FIG. 4.

To load a cargo, the platform 14 is placed on the ground with the wheels 22 extended, FIG. 1, and a cargo is loaded up the ramp 42, FIG. 10, and fastened using holes 30, FIG. 3, in the raised sides 29. The boom 13 is raised to a position past vertical so the cable 21 extends down past the rear of the truck 16 and is reached through the hole 26 for attaching to the hook 25, FIG. 3.

By operating the winch 15 at the top of the boom 13, the front end of the platform is raised to about the height of the back of the truck 16, the wheels extended from the rear of the platform rolling on the ground. Now, the boom is lowered about half way down, FIG. 2, to a slope matching that of the platform, and the platform with its load is pulled up onto the boom all the way to the top, FIG. 5.

Finally, the boom is lowered against the stops 37, the wheels 22 are retracted and the safety chain 33, FIG. 7, is attached to the hook 34. The unloading process is these steps in reverse order.

Since the hydraulic cylinders 20 are double acting, they cause the boom 13 to bear down upon the stops 37 with force. The downward force of the hydraulic cylinders 20 holds the boom 13 down forcefully on the stops 37 which effectively prevents any bouncing or rattling of the boom 13 during movement of the truck 16.

Repeating for emphasis, the hook 25 is on the under side of the platform 14 at the center of the of the hole 25 but recessed back somewhat from the front edge to ensure that the front edge of the platform 14 is pulled onto the boom 13 completely to its forward-most position. The hole 26 is formed through the surface of the platform 14 over the hook 25 to permit easier attachment of the hook from above the platform.

It is important that the upper end of the boom 13 is tilted beyond the tailgate of the pickup truck 16. This permits the raising and lowering of the platform 14 without making contact with the tailgate.

To begin loading the platform 14 and the cargo 11 onto the pickup truck 16, the control unit 39, FIG. 9, is connected by attaching the plug 41. Next, the safety switch on the control unit 39 is set to the "on" position to enable the remaining switches. The operator begins to raise the platform 14 by the sequential use of the winch switch and the boom switch, as described above.

The operator alternates back and forth in the operation of these switches, as necessary. As the skill of the operator increases, it is possible to use both the boom switch and the winch switch at the same time to effect a more rapid and coordinated lifting process.

After the cable 21 is connected under the front of the platform 14 to the hook 25, the winch switch is set to tighten the cable which raises the front of the platform 14. As the front of the platform rises, more of its weight bears upon the wheels 22 at the other end.

As the front of the platform 14 continues to rise, the platform 14 forms an increasing angle with the ground. The telescoping bars 23, being extended, lessen the severity of this angle.

As the front of the platform 14 rises, the wheels 22 at the rear of the platform 14 lessen friction between the other end of the platform 14 and the ground. As the front of the platform 14 is raised, the boom switch is set to lower the upper end of the boom 13 slightly toward the cab of the pickup truck 16.

Eventually, the platform 14 will contact the lower end of the boom 13, when both the boom and the platform are at approximately the same angle, as shown in FIG. 2. In this position, the rear of the platform 14 remains supported by the wheels 22 that are on the ground.

In FIG. 4, a cross sectional view illustrates the contact between the platform 14 and the boom 13 along the length of the boom. Intermediate the upper and lower ends of the boom 13, just after the point of initial contact between the platform 14 and the boom 13, are angle rails 45 attached to each side of the boom 13 and extending along its length to cooperate with two projections 46, each extending from a block 47 attached to the underside of the platform.

As the platform 14 is pulled further onto the boom 13, the projections 46 pass under the rails 45 to ensure that the platform cannot move away from the boom.

Two friction reducing strips 32 are attached to the underside of the platform 14, near to the raised end, to reduce the friction between that end of the platform 14 and the boom 13 as the platform slides on the boom. It has been determined that each strip 32 can be formed of approximately one foot in length of a high density plastic material. These friction reducing strips are replaced as needed when they wear out.

In FIG. 5, the platform 14 is shown in a position even further on the boom 13 toward its upper end than in FIG. 2. To accomplish this, the operator continues to actuate the winch switch (FIG. 9) until the platform has been pulled forward to the upper end of the now partly lowered boom. As the wheels 22 are no longer in contact with the ground, the entire weight of the platform and the cargo is now on the pickup truck 16.

The boom switch now is actuated to lower the boom with the platform and the cargo in the position shown in FIG. 6. In this position, the upper end of the boom is on the stops 37 which limit additional further downward movement.

With the platform separate from the other structure and with the boom pivotable, an important advantage is available not found in prior arrangements. That is, for a cargo that does not have to be affixed to and supported by the platform surface, the cable is attached to such cargo, the winch then raises that cargo to a height above the tailgate and, while thus suspended by the cable, the boom is pivoted down to its horizontal position with the cargo between the spaced rails of the boom. The cargo now can be attached securely for transporting.

The invention has been shown, described and illustrated in substantial detail with reference to the presently preferred embodiment. It will be understood by those skilled in this art that other and further changes and modifications can be made without departing from the spirit and scope of the invention which is defined by the appended claims.

What is claimed is:

1. A cargo handling apparatus adapted for use with a preselected vehicle, having a load carrying area, to easily, smoothly and safely raise a cargo and deposit the cargo in the load carrying area on the vehicle for transporting to a desired location where the cargo is unloaded with equal ease, smoothness and safety, comprising:

frame assembly means formed of a predetermined width and length to fit the load carrying area of said preselected vehicle and defining a predetermined distance above the ground;

boom means mounted pivotally at one end and supported by said frame assembly means, including winch means with flexible means extending from an end of said boom means furthermost from said one end;

separate platform means to support said cargo, so that said flexible means extends substantially unobstructed from said winch means vertically down to one end of said platform means when said platform means is separate from said boom means; and power means to adjust the position of said boom means and to operate said winch means;

whereby said boom means is pivoted so that said an end of said boom means is past a vertical, said flexible means is attached to said one end of said platform means for raising said one end of said platform means, without encountering said vehicle, to a predetermined height equal to said distance above the ground, said boom means then is lowered to approximately 45 degrees, said platform means is pulled up onto said boom means by said winch means, and said an end of said boom means is lowered in a direction away from said cargo to a position in said load carrying area on said vehicle for transporting said cargo.

2. A cargo handling apparatus as defined by claim 1 including means to secure said cargo on said platform means.

3. A cargo handling apparatus as defined by claim 1 wherein said platform means includes hook means for attaching a cargo removably on said platform means.

4. A cargo handling apparatus as defined by claim 1 wherein said power means includes hydraulic means for moving said boom means to predetermined positions.

5. A cargo handling apparatus as defined by claim 1 including control means for said power means.

6. A cargo handling apparatus as defined by claim 5 wherein said control means is in the form of a hand held unit, so that an operator is in a location of relative safety during an operation of said apparatus.

7. A cargo handling apparatus as defined by claim 1 wherein an end of said platform means furthermost from said one end includes means to minimize frictional contact with the ground.

8. A cargo handling apparatus as defined by claim 7 wherein said means to minimize frictional contact with the ground includes roller means.

9. A cargo lifting and moving apparatus particularly well suited for use with pickup trucks, comprising:
   an integral frame assembly inserted as a unit into a bed of a pickup truck;
   said integral frame assembly supporting at least one hydraulic cylinder means near an aft area, and having an end of a boom connected pivotally at said aft area of said integral frame assembly for positioning pivotally by extension and retraction of a part of said at least one hydraulic cylinder means, said hydraulic cylinder means pivoting said boom from a horizontal position through an angle greater than ninety degrees;
   winch means mounted on said boom at an end of said boom furthermost from said end of said boom that is connected pivotally at said aft area of said integral frame assembly;
   said winch means having a vertically extending cable terminating in a hook for connecting with a separate platform;
   said separate platform providing an intermediate surface upon which cargo items may be placed;
   said separate platform being a substantially rectangular planer structure with means to reinforce said planer structure and
   said winch means being connected to a front portion of said platform and lifting and pulling said platform onto said boom.

10. Said cargo lifting and moving apparatus of claim 9 including an abutment having cushion means to dampen vibration, eliminate noise, and to provide a replaceable wear surface.

11. Said cargo lifting and moving apparatus of claim 9 wherein said platform includes a wheel attached extensively to telescoping arm members.

12. Said cargo lifting and moving apparatus of claim 9 wherein said platform means has side panel.

13. Said cargo lifting and moving apparatus of claim 9 wherein said platform means includes attachment means for fastening a cargo.

14. Said cargo lifting and moving apparatus of claim 9 including angle rail means on said boom means for cooperating with a pin and block.

15. Said cargo lifting and moving apparatus of claim 9 wherein said platform has friction reducing means attached to an underside of said front portion of said platform to reduce friction.

16. Said cargo lifting and moving apparatus of claim 11 wherein said telescoping arm members are secured in position by at least one spring loaded pin.

17. Said cargo lifting and moving apparatus of claim 9, wherein said platform includes an access hole.

18. Said cargo lifting and moving apparatus of claim 13, wherein said attachment means is in the form of holes in side panels of said platform.

19. Said cargo lifting and moving apparatus of claim 15, including high density plastic material attached to said platform to provide an intermediate surface between said front portion of said platform and said boom.

20. Said cargo lifting and moving apparatus of claim 9, wherein said boom includes roller wheel means to reduce friction between said boom and said platform.

21. Said cargo lifting and moving apparatus of claim 9 including safety chain and safety hook means intermittently fastenable to certain of a cargo attachment means while being permanently affixed to either said boom or to said frame to maintain said platform operative with said boom when said cable breaks.

22. Said cargo lifting and moving apparatus of claim 9 including a 5th wheel attached to said frame.

23. Said cargo lifting and moving apparatus of claim 9 including a light attached to said boom.

24. Said cargo lifting and moving apparatus of claim 9, including an inclined ramp attached to an aft area of said platform.

25. Said cargo lifting and moving apparatus of claim 10, including an elevated attachment to said frame assembly with members extending higher than said abutment to protect said vehicle.

* * * * *